United States Patent
Chen et al.

(10) Patent No.: US 12,237,502 B2
(45) Date of Patent: Feb. 25, 2025

(54) NEGATIVE ELECTRODE PLATE, LITHIUM-ION BATTERY AND APPARATUS

(71) Applicant: CONTEMPORARY AMPEREX TECHNOLOGY (HONG KONG) LIMITED, Hong Kong (CN)

(72) Inventors: Shitong Chen, Ningde (CN); Bin Xie, Ningde (CN); Zhao Hu, Ningde (CN); Zhijie Gong, Ningde (CN); Wen Li, Ningde (CN); Lin Ma, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 520 days.

(21) Appl. No.: 17/587,504

(22) Filed: Jan. 28, 2022

(65) Prior Publication Data

US 2022/0158177 A1    May 19, 2022

Related U.S. Application Data

(63) Continuation of application No. PCT/CN2020/107939, filed on Aug. 7, 2020.

(30) Foreign Application Priority Data

Aug. 13, 2019 (CN) .......................... 201910744408.2

(51) Int. Cl.
*H01M 4/36*    (2006.01)
*H01M 4/13*    (2010.01)
(Continued)

(52) U.S. Cl.
CPC ........... *H01M 4/366* (2013.01); *H01M 4/133* (2013.01); *H01M 4/134* (2013.01); *H01M 4/36* (2013.01);
(Continued)

(58) Field of Classification Search
CPC ........ H01M 4/133; H01M 4/134; H01M 4/36; H01M 4/366; H01M 4/364
See application file for complete search history.

(56) References Cited

U.S. PATENT DOCUMENTS

2015/0000118 A1    1/2015    Zhao et al.

FOREIGN PATENT DOCUMENTS

| CN | 206992216 U | 2/2018 |
|----|-------------|--------|
| CN | 108847474 A | 11/2018 |

(Continued)

OTHER PUBLICATIONS

Machine Translation of: CN 109786662 A, Chen et al., May 21, 2019.*

(Continued)

*Primary Examiner* — Kenneth J Douyette
(74) *Attorney, Agent, or Firm* — Kilpatrick Townsend & Stockton LLP

(57) ABSTRACT

A negative electrode plate, a lithium-ion battery and an apparatus are disclosed. The negative electrode plate includes a negative electrode current collector, a negative electrode active material layer including a negative electrode active material and disposed on at least one surface of the negative electrode current collector, and a lithium-replenishing layer disposed on a surface of the negative electrode active material layer away from the negative current collector. The negative electrode plate can effectively ameliorate the problem of plate heating, and channels formed by the lithium-replenishing region and the gap region can enable the lithium-ion battery to be effectively impregnated with the electrolyte after electrolyte injection is performed to the lithium-ion battery, thereby improving the energy density of the battery while also improving the service life and kinetic performance of the battery.

20 Claims, 5 Drawing Sheets

(51) Int. Cl.
*H01M 4/133* (2010.01)
*H01M 4/134* (2010.01)
*H01M 4/38* (2006.01)
*H01M 4/58* (2010.01)
*H01M 4/587* (2010.01)
*H01M 4/64* (2006.01)
*H01M 10/0525* (2010.01)
*H01M 4/02* (2006.01)

(52) U.S. Cl.
CPC ........... *H01M 4/364* (2013.01); *H01M 4/382* (2013.01); *H01M 4/386* (2013.01); *H01M 4/587* (2013.01); *H01M 4/64* (2013.01); *H01M 10/0525* (2013.01); *H01M 2004/027* (2013.01)

(56) References Cited

FOREIGN PATENT DOCUMENTS

| | | | |
|---|---|---|---|
| CN | 108878775 | A | 11/2018 |
| CN | 109004234 | A | 12/2018 |
| CN | 109786662 | A | 5/2019 |
| JP | 2008243828 | A | 10/2008 |

OTHER PUBLICATIONS

Contemporary Amperex Technology Co., Limited, International Search Report, PCT/CN2020/107939, Nov. 10, 2020, 6 pgs.

English translation of the International Search Report received in the corresponding International Application PCT/CN2020/107939, mailed Nov. 10, 2020.

Written Opinion received in the corresponding International Application PCT/CN2020/107939, mailed Nov. 10, 2020.

The first Office Action received in the corresponding Chinese Application 201910744408.2, mailed Jul. 21, 2021.

The second Office Action received in the corresponding Chinese Application 201910744408.2, mailed Jan. 25, 2022.

Notice of Granting Utility Patent Right received in the corresponding Chinese Application 201910744408.2, mailed May 6, 2022.

The extended European search report received in the corresponding European Application 20852925.5, mailed Jul. 6, 2022.

\* cited by examiner

NEGATIVE ELECTRODE PLATE, LITHIUM-ION BATTERY AND APPARATUS

CROSS REFERENCE TO RELATED APPLICATIONS

The present application is a continuation of PCT application No. PCT/CN 2020/107939, filed on Aug. 7, 2020. The PCT application claims the priority of Chinese patent application No. CN 201910744408.2, entitled "a lithium-replenishing negative electrode plate, and lithium-ion battery including same", filed on Aug. 13, 2019. Each of the above-referenced applications is incorporated by reference herein in its entirety.

TECHNICAL FIELD

The present application relates to the field of battery technology, and particularly to a lithium-replenishing negative electrode plate, a lithium-ion battery and apparatus.

BACKGROUND

As new-energy vehicles are getting popularized, there has been increasing requirements on power batteries for the vehicles. For example, it is required that a battery shall have high energy density, long cycle life and stable performance, as well as a capability of fast charge.

At present, it is usually used to improve cycle performance and energy density of lithium-ion batteries by optimizing performances of positive and negative electrode materials. A negative electrode is an important part of a lithium-ion battery, and by improving cycle stability and energy density of the negative electrode, electro-chemical performance of the lithium-ion battery may be effectively improved. In industrial production, in order to increase the energy density of lithium-ion batteries, different positive and negative materials, usually, are matched to obtain a more matching energy density, and to maximize battery performance. Alternatively, lithium replenishing may be applied so as to increase amount of lithium in an entire lithium-ion battery system. However, a process and technology of replenishing lithium often leads to generations of a large amount of reaction heat, which in turn affects the cycle life, the energy density and dynamic performance of the lithium-ion batteries. Therefore, it is highly important for increasing comprehensive performance of the lithium-ion batteries as to how to implement effective lithium replenishing while preventing a large amount of reaction heat from affecting the performance of the lithium-ion batteries.

SUMMARY

In regard to the problem discussed in the background, the present application provides a lithium-replenishing negative electrode plate, a lithium-ion battery and an apparatus. The lithium-replenishing negative electrode plate can effectively alleviate a heating problem of the plate, increase a battery energy density, and improve a battery cycle life and a dynamic performance thereof.

In order to achieve the above objective, in a first aspect of the present application, a lithium-replenishing negative electrode plate is provided. The lithium-replenishing negative electrode plate includes a negative electrode current collector; a negative electrode active material layer including a negative electrode active material and disposed on at least one surface of the negative electrode current collector; and a lithium-replenishing layer disposed on a surface of the negative electrode active material layer away from the negative current collector. Herein, the lithium-replenishing layer includes a lithium-replenishing region and a gap region, and the lithium-replenishing region and the gap region are interconnected in order. The lithium-replenishing region and the gap region satisfy condition of: $3.3 \times 10^{-3} \leq A/(A+B) < 0.98$, according to a specific embodiment of the present application.

Herein, A is a width of the lithium-replenishing region, B is a width of the gap region, and A, B are measurement values measured along an extension direction of connection between the lithium-replenishing region and the gap region.

In a second aspect of the present application, a lithium-ion battery is provided. The lithium-ion battery includes a positive electrode, a negative electrode, an electrolyte and a separator. Herein, the negative electrode includes the negative electrode plate according to the first aspect of the present application.

In a third aspect of the present application, a battery module is provided. The battery module includes the lithium-ion battery according to the second aspect of the present application.

In a fourth aspect of the present application, a battery pack is provided. The battery pack includes the battery module according to the third aspect of the present application.

In a fifth aspect of the present application, an apparatus is provided. The apparatus includes the lithium-ion battery according to the second aspect of the present application.

Compared with the existing technologies, the above technical solutions at least have following advantages.

In the present application, a strip-shaped lithium-replenishing layer is disposed on the surface of the negative electrode plate, which can increase energy density of the lithium-ion battery. The lithium-replenishing region and the gap region are interconnected in order, which can quickly dissipate a large amount of heat generated during lithium replenishing through an air channel formed by the lithium-replenishing region and the gas region, it therefore alleviates the heating problem of the negative electrode plate. Besides, the channel formed by the lithium-replenishing region and the gas region can enable the negative electrode plate to be effectively impregnated with the electrolyte after electrolyte injection is performed to the lithium-ion battery, thereby further improving electro-chemical performance of the lithium-ion battery.

Figure 1:
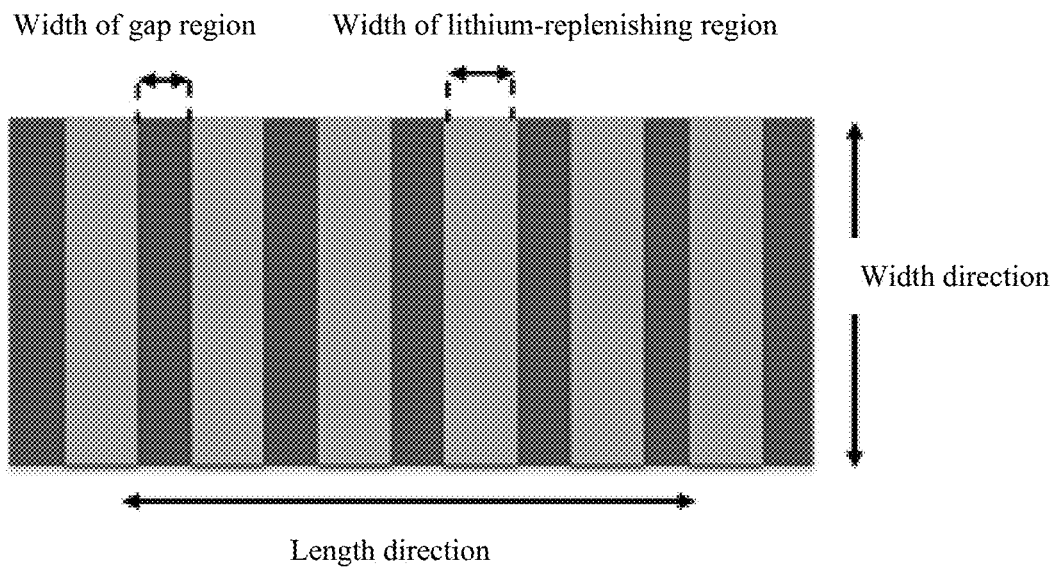
FIG. 1 illustrates a top view of outside of a lithium-replenishing battery plate according to a specific embodiment of the present application.
Figure 2:
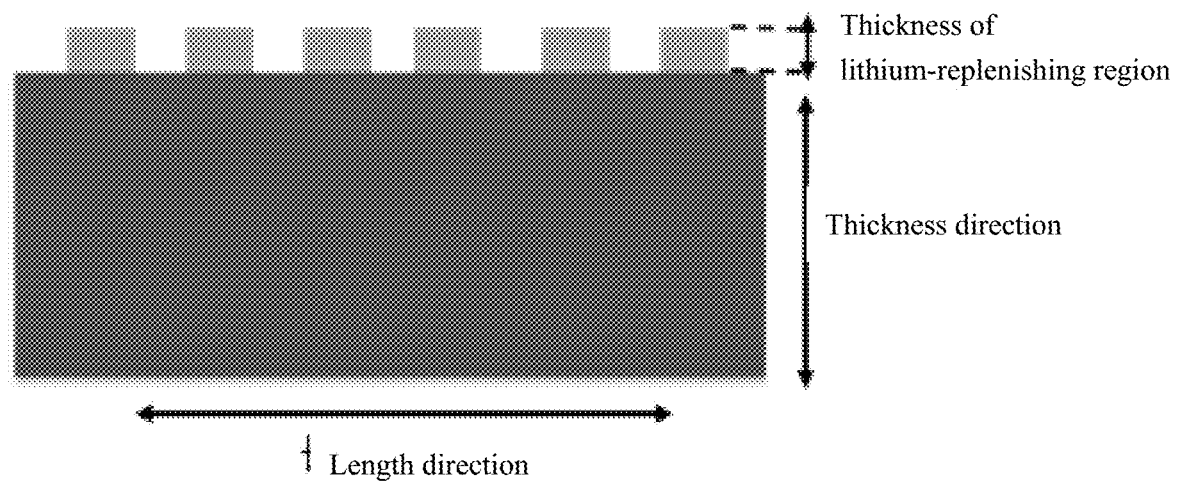
FIG. 2 illustrates a cross-sectional view of outside of the lithium-replenishing battery plate according to a specific embodiment of the present application.

Herein, reference signs are explained as follows: 1—battery pack, 2—upper body, 3—lower body, 4—battery module, 5—lithium-ion battery, 51—housing, 52—electrode component, 53—cover plate.

DETAILED DESCRIPTION

In order to make the objectives, the technical solutions and the advantages of the present application clearer, the present application will be described in further detail with reference to the accompanying drawings and the embodiments. It shall be noted that the specific embodiments described herein are only to explain rather to limit the present application.

In order to be concise, the present application only specifically discloses some data ranges. However, any lower limit may be combined with any upper limit to form a scope that is not clearly disclosed. Any lower limit may be combined with another lower limit to form a scope that is not clearly disclosed. Similarly, any upper limit may be combined with any other upper limit to form a scope that is not clearly disclosed. Each point or value disclosed individually may be taken as a lower or higher limit to be combined with any other point or single value or any other lower limit or higher limit to form a scope that is not clearly disclosed.

In the present application, it shall be noted that unless stated otherwise, "higher than" and "lower than" means to include a numeral itself, and "more" as in "one or more" means two or more than two.

Unless stated otherwise, a technical term used herein has a common meaning understandable by those skilled in the art. Unless stated otherwise, a value of each parameter mentioned in the present application may be measured in various measurement methods commonly used in the existing technology, for example, methods provided in the embodiments of the present application may be used to perform testing.

In the following, a lithium-replenishing negative electrode plate, a lithium-ion battery, a battery module, a battery pack and an apparatus thereof is described in detail.

[Negative Electrode Plate]

Firstly, the negative electrode plate provided in the first aspect of the present application is described. The first aspect of the present application provides the negative electrode plate, which includes a negative electrode current collector, a negative electrode active material layer including a negative electrode active material and disposed on at least one surface of the negative electrode current collector, and a lithium-replenishing layer disposed on a surface of the negative electrode active material layer away from the negative current collector. The lithium-replenishing layer includes a lithium-replenishing region and a gap region, the lithium-replenishing region and the gap region are interconnected in order.

According to a preferable embodiment of the present application, the lithium-replenishing region and the gap region satisfy condition of $3.3 \times 10^{-3} \leq A/(A+B) < 0.98$.

Herein, A is a width of the lithium-replenishing region, B is a width of the gap region, and A, B are measurement values measured along an extension direction of connection between the lithium-replenishing region and the gap region.

According to a preferable embodiment of the present application, the lithium-replenishing region and the gap region satisfy condition of $3.0 \times 10^{-2} \leq A/(A+B) < 0.95$.

The width of the lithium-replenishing region and the gap region affect reaction heat diffusion caused by the lithium replenishing, and further affect the electro-chemical performance of the lithium-ion battery. The applicant finds that the lithium-replenishing region and the gap region, connected in order in the lithium-replenishing layer, can effectively form an air channel, where heat generated during lithium replenishing can quickly, relieving a problem of heating of the plate during the lithium replenishing. Besides, after an electrolyte is injected into the lithium-ion battery, a structure of sequential connection of the lithium-replenishing region and the gap region can improve infiltration of the electrolyte into the negative electrode plate, thereby further improving cycle performance, capacity and safety of the lithium-ion battery.

The applicant finds that the width A of the lithium-replenishing region and the width B of the gap region shall be related in a certain manner so that the safety performance and the electro-chemical performance of the negative electrode plate are good, because a proper air channel can be obtained through a reasonable adjustment of the width of the lithium-replenishing region and the width of the gap region. The reason is that for the negative electrode plate, a large amount of heat may be generated when a negative electrode plate is embedded into a lithium precursor provided in the lithium-replenishing region, and the width of the air channel depends on the width of the gap region, the width of the lithium-replenishing region and the width of the gap region need to be reasonably adjusted to improve heat dissipation capability of the negative electrode plate and the infiltration of the electrolyte into the negative electrode plate.

During formation of the present application, the applicant did penetrating research on effect of the width of the lithium-replenishing region. The applicant finds that the width of the lithium-replenishing region affects a lithium-replenishing result of the negative electrode plate. In order to ensure that the negative electrode plate can perform lithium-replenishing more effectively, the width and thickness of the lithium-replenishing region need to be reasonably designed. The thickness of the lithium-replenishing region is a measurement value of the lithium-replenishing layer in a vertical direction of the plate. The thickness of the lithium-replenishing region cannot be too large. Otherwise, a volume energy density of the lithium-ion battery would be affected. Therefore, the width of the lithium-replenishing region needs to be designed reasonably. In a case where a lithium-replenishing amount and the thickness of the lithium-replenishing region are set, the width and a compaction of the lithium-replenishing region are in negative correlation to some extent. Therefore, in order for lithium ions in the lithium-replenishing region to be embedded into the negative electrode plate more properly, the width of the lithium-replenishing region needs to be designed appropriately to obtain a reasonable lithium-replenishing region density. This is advantageous for the lithium ions to be embedded into the negative electrode plate to achieve an excellent lithium-replenishing result.

Optionally, the width A of the lithium-replenishing region ranges is 10 μm≤A≤5000 μm. Further optionally, the width A of the lithium-replenishing region ranges is 50 μm≤A≤3500 μm.

During development of the present application, the applicant also did intensive research on effect of the width of the gap region. The applicant finds that in a case where there is an identical width of the lithium-replenishing region and an identical thickness of the lithium-replenishing region, the width B of the gap region needs to be reasonably designed. If the width B of the gap region is excessively small (<10 µm), a heat dissipation channel may be available to some extent, but may not be able to provide sufficient area as an air channel to carry away reaction heat generated by an active material and the lithium-replenishing layer, thereby relief to a winding temperature of the plate is not satisfying. Besides, if the width B of the gap region is excessively large (>3000 µm), a heat dissipation channel sufficiently large may be available and heat generated during lithium replenishing is dissipated quickly, but the lithium-replenishing region would be smaller, thereby lithium replenished is reduced, which may result in that efficiency of the lithium precursor in the lithium-replenishing region spreading to the gap region is sufficiently reduced, which may eventually affect performance of the battery. Therefore, a channel of a certain size is needed so that air may flow quickly to carry away heat generated from reaction between the negative electrode active material layer and the lithium-replenishing layer to reduce the winding temperature of the plate, while ensuring that the lithium-replenishing layer spreads on a surface of the active material to improve efficiency of lithium replenishing of the negative electrode plate.

Optionally, a width B of the gap region ranges is $10\ \mu m \leq B \leq 3000\ \mu m$. Further optionally, the width of the gap region ranges is $20\ \mu m \leq B \leq 1500\ \mu m$.

A middle line of the lithium-replenishing region is obtained by connecting middle points of junctions of the lithium-replenishing region in the extension direction of the negative electrode plate. An angle between the middle line of the lithium-replenishing region and a direction of a width of the plate is θ whose value affects performance of the lithium-ion battery. Because θ may be of different values, and may correspond to different lengths of the air channel, heat dissipation after lithium replenishing of the negative electrode plate may be affected. Because a larger value of θ corresponds to a longer air channel, a heat dissipation path is lengthened, affecting heat dissipation of the negative electrode plate.

Optionally, the angle θ satisfies condition of $0° \leq \theta \leq 75°$. Further optionally, the angle θ satisfies condition of $0° \leq \theta \leq 45°$.

Figure 3:
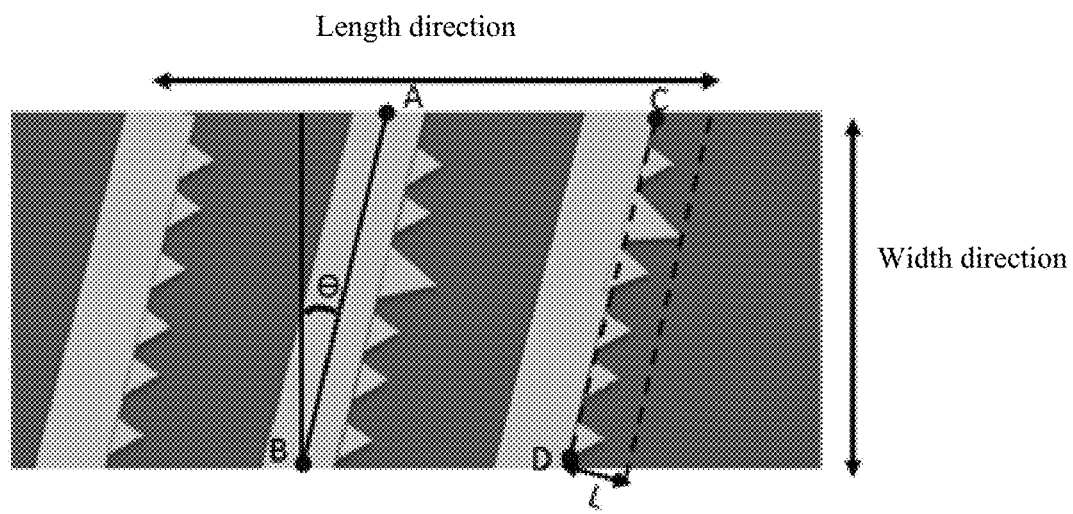
FIG. 3 illustrates a partially zoomed-in view of outside of the lithium-replenishing battery plate according to a specific embodiment of the present application.
Figure 4:
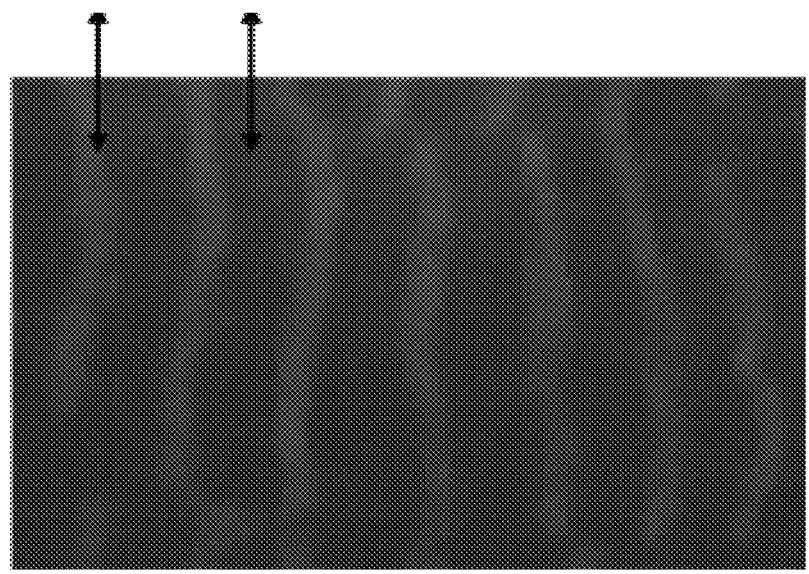
FIG. 4 illustrates a lithium-replenishing outside view of the plate after a lithium-ion battery cell is formed, and the plate is lithium-replenished according to a specific embodiment of the present application.
Figure 5:
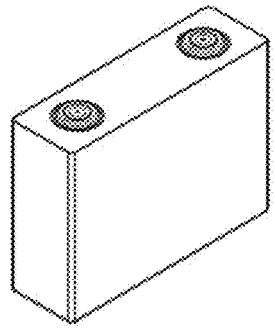
FIG. 5 illustrates a view of a lithium-ion battery according to an embodiment of the present application.
Figure 6:
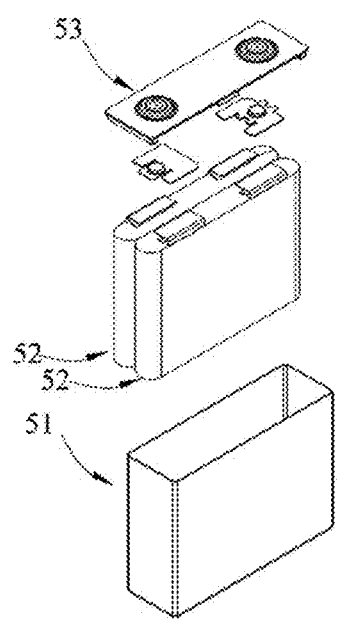
FIG. 6 illustrates an explosive view of a lithium-ion battery according to an embodiment of the present application.

A ratio of a distance difference L of an edge of the lithium-replenishing region to the width A of the lithium-replenishing region affects heat dissipation performance of a lithium-replenished negative electrode plate. It shall be noted that the distance difference L of the edge of the lithium-replenishing region is a distance between a closest point of an edge boundary and a point farthest from the edge boundary (refer to FIG. 3). The edge boundary refers to a connection line between a boundary formed by an adjacent lithium-replenishing region and gap region and an intersection point formed by a boundary in a length direction of the negative electrode plate. A smaller ratio of the distance difference L of the edge of the lithium-replenishing region to the width A of the lithium-replenishing region would result in a smaller effect of the edge of the lithium-replenishing region on air flow. An ideal condition is that the distance difference L of the edge of the lithium-replenishing region is 0, which, however, is difficult to achieve through a current production process. Therefore, the applicant did a lot of research for the purpose of obtaining a proper range of values of L/A, so that the heat dissipation performance and the electro-chemical performance of the lithium-ion battery to be in best conditions.

Optionally, the ratio of the distance difference L of the edge of the lithium-replenishing region to the width A of the lithium-replenishing region satisfies condition of $0 < L/A \leq 0.8$. Further optionally, the ratio of the distance difference L of the edge of the lithium-replenishing region to the width A of the lithium-replenishing region satisfies condition of $0 < L/A \leq 0.5$.

The thickness of the lithium-replenishing region and a weight of the negative electrode active material affect a final performance of the lithium-replenished negative electrode plate, because an amount of lithium replenished shall match the weight of the negative electrode active material, and an excess amount would result in waste. After a large amount of research, the applicant finds that when the compaction of the lithium-replenishing region remains in a proper scope, the thickness of the lithium-replenishing region and the weight of the negative electrode active material are designed as within a certain scope, so that a lithium-replenishing result is better while not eventually affecting heat dissipation. It shall be noted that in the present application, C/M is described by $1540.25\ \mu m/mg/mm^2$, and all C/Ms in the present application are described by $1540.25\ \mu m/mg/mm^2$.

Optionally, C is the thickness of the lithium-replenishing region, M is the weight of the negative electrode active material, and a ratio of the thickness C of the lithium-replenishing region to the weight M of the negative electrode active material satisfies condition of $0.02 \leq C/M \leq 0.18$. Further optionally, the ratio of the thickness C of the lithium-replenishing region to the weight M of the negative electrode active material satisfies condition of $0.06 \leq C/M \leq 0.13$.

A component of the lithium-replenishing layer may affect the performance of the lithium-ion battery. Complicated components may be formed on a surface of the negative electrode plate after lithium replenishing, and may affect spread of lithium ions in the electrolyte towards the negative electrode plate. Therefore, types and amount of components formed on the surface after the lithium replenishing have a significant effect on a final electric performance of the lithium-ion battery.

Optionally, the lithium-replenishing region is composed of one or more of elemental lithium, lithium oxide, lithium nitride, lithium fluoride, lithium hydroxide and a lithium silicon alloy.

A type of the negative electrode active material has a certain effect on the spread of the lithium ions in the electrolyte after the negative electrode plate is lithium-replenished. Therefore, it is expected that types of negative electrode active materials that can improve spread performance of electrolyte lithium ions in the negative electrode plate can be screened in the present application.

Optionally, the negative electrode active material contains one or more of a Si-based material, a Sn-based material, Si/C, Sn/C, Si halide, Sn halide, Si alloy and Sn alloy.

Secondly, the lithium-ion battery provided in the second aspect of the present application is described. The second aspect of the present application provides a lithium-ion battery, which includes a positive electrode, a negative electrode, an electrolyte and a separator. Herein, the negative electrode includes the negative electrode plate according to the first aspect of the present application.

After the negative electrode plate including the lithium-replenishing layer is formed through liquid injection, the thickness of the lithium-replenishing region experiences a great change, because a solid electrolyte interphase (SEI) film is formed through interaction between the lithium-replenishing region and the electrolyte. The thickness of the lithium-replenishing region of the formed negative electrode plate affects the performance of the lithium-ion battery, because the lithium-replenishing region formed can affect spread of lithium ions in the electrolyte towards the negative electrode plate.

Optionally, the thickness of the lithium-replenishing region after the lithium-ion battery is formed is C1 which ranges as $0.01 \leq C1 \leq 10$ μm. Further optionally, the thickness C1 of the lithium-replenishing region after the lithium-ion battery is formed ranges as $0.05 \leq C1 \leq 5$ μm.

[Lithium-Ion Battery]

In the second aspect of the present application, the lithium-ion battery includes a positive electrode, a negative electrode, an electrolyte and a separator. Herein, the negative electrode includes the negative electrode plate according to the first aspect of the present application.

A positive electrode plate includes a positive current collector and a positive separator. The positive separator is located on the positive current collector and includes a positive active material, a positive binder, and a positive conductive agent. A specific type and composition of the positive current collector are not subject to specific restrictions, but may be selected based on actual needs. The positive current collector may be aluminum foil, nickel foil or a polymer conductive film. Optionally, the positive current collector is aluminum foil.

The positive active material may be but not limited to one or more of following materials: a lithium transition metal composite oxide (for example, lithium iron phosphide, lithium iron manganese phosphide, lithium cobalt oxide, lithium nickel oxide, lithium manganese oxide, lithium nickel manganese oxide, lithium nickel cobalt manganese oxide and lithium nickel cobalt aluminum oxide) and a compound obtained by adding another transition metal or non-transition metal to the lithium transition metal composite oxide.

In the second aspect of the present application, the lithium-ion battery further includes the separator of which a type is not limited particularly but may be any separator material used in current batteries, such as but not being limited to polyethylene, polypropylene, polyvinylidene fluoride and multilayer composite films thereof.

In the second aspect of the present application, the lithium-ion battery further includes the electrolyte of which a particular type and composition are not specifically limited but may be decided according to actual practice.

[Battery Module]

In a third aspect of the present application, a battery module is described briefly in following.

Figure 7:
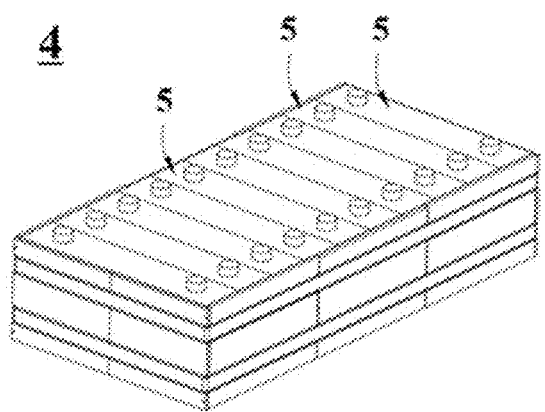
FIG. 7 illustrates a schematic view of a battery module according to an embodiment of the present application.

FIG. 7 shows a three-dimensional diagram of a battery module according to an embodiment of the present application. With reference to FIG. 7, a battery module 4 according to the present application includes a plurality of lithium-ion batteries 5 that are arranged vertically.

The battery module 4 may be taken as a power supply or energy storage apparatus. An amount of the lithium-ion batteries 5 in the battery module 4 may be adjusted according to application and capacity of the battery module 4.

[Battery Pack]

In the fourth aspect of the present application, a battery pack is described briefly in following.

Figure 8:
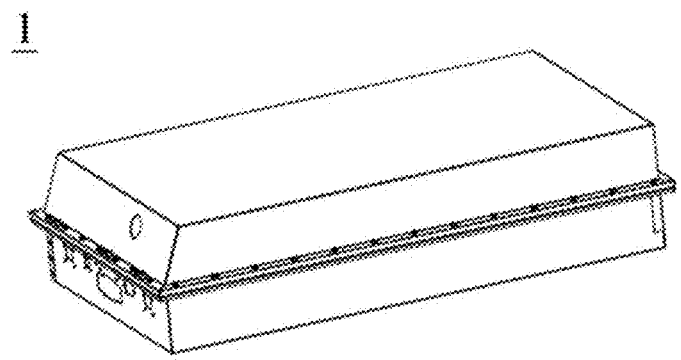
FIG. 8 illustrates a schematic view of a battery pack according to an embodiment of the present application.
Figure 9:
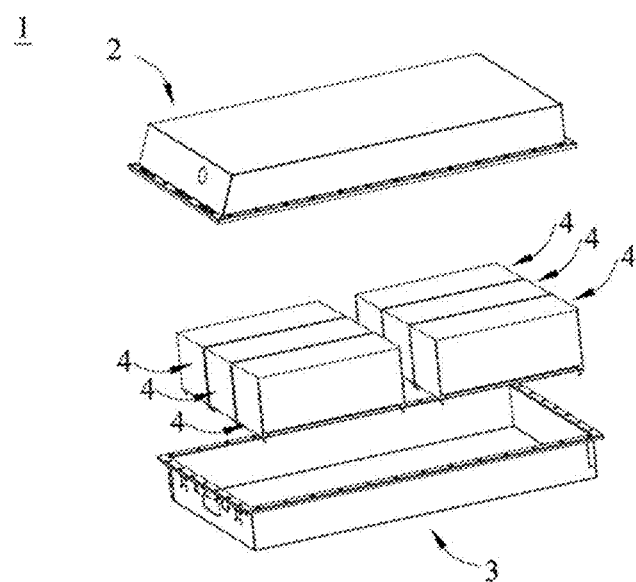
FIG. 9 illustrates an explosive view of FIG. 8.

FIG. 8 shows a three-dimensional diagram of a battery pack according to an embodiment of the present application. FIG. 9 is an explosive view of the battery pack shown in FIG. 8.

With reference to FIG. 8 and FIG. 9, a battery pack 1 according to the present application includes an upper body 2, a lower body 3 and the battery module 4. Herein, the upper body 2 and the lower body 3 are assembled together to form a space accommodating the battery module 4. The battery module 4 is disposed in the space formed by the upper body 2 and the lower body 3 assembled together.

An output pole of the battery module 4 passes out of one or two of the upper body 2 and the lower body 3 to supply power to the outside or to be charged by the outside.

It shall be noted that an amount and arrangement of battery modules 4 used in the battery pack 1 may be determined based on an actual need. The battery pack 1 may be taken as a power supply or an energy storage apparatus.

[Apparatus]

In the fifth aspect of the present application, an apparatus is described briefly in following. The apparatus includes the lithium-ion battery in the second aspect of the present application. The lithium-ion battery may be taken as a power supply of the apparatus or may be taken as an energy storage unit of the apparatus. The apparatus may be but not limited to a mobile device (such as a mobile phone and a laptop computer), an electric vehicle (such as a pure-electric vehicle, a hybrid electric vehicle, a plug-in hybrid electric vehicle, an electric bicycle, an electric scooter, an electric golf vehicle, an electric truck, and so on), an electric train, a ship, a satellite, an energy storage system, and so on.

The apparatus in the present application applies the lithium-ion battery provided in the present application, and thus at least has advantages identical with that of the lithium-ion battery.

Figure 10:
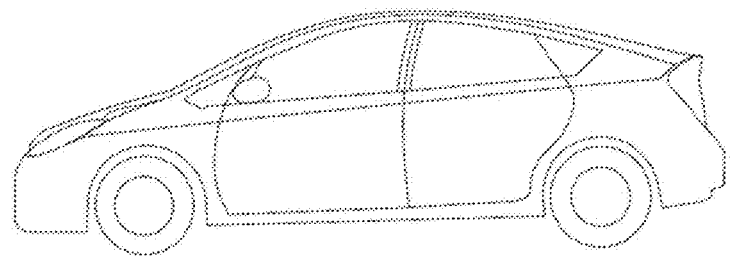
FIG. 10 illustrates a schematic view of an apparatus that the lithium-ion battery is used as a power supply according to an embodiment of the present application.

FIG. 10 is a schematic view of a lithium-ion battery being taken as a power supply apparatus according to an embodiment of the present application. As an example, in FIG. 10, an apparatus using the lithium-ion battery 5 is an electric car. An apparatus using the lithium-ion battery 5 may be, apart from the electric car, any electric vehicle (such as an electric bus, an electric tram, an electric bicycle, and electric motorbike, an electric scooter, an electric golf vehicle, an electric truck), an electric ship, an electric tool, and electric device and an energy storage system.

A lithium-ion battery, a battery module or a battery pack may be selected for the apparatus according to a particular need.

In another example, the apparatus may be a mobile phone, a tablet computer, a laptop computer and so on. It is generally required that the apparatus shall be light and thin, thus the lithium-ion battery may be used as a power supply.

Embodiments of the present application will be described by using particular examples. Those skilled in the art may easily know other advantages and functions of the present application according to the content disclosed in the present application. The present application may further be implemented or applied in another different implementation. Based on varied opinions and applications, details of the present description may further be modified or changed without departing from the spirit of the present application.

It shall be noted that processing devices or apparatuses not specifically noted in the following embodiments refer to conventional devices or apparatuses in the existing technology.

In addition, it shall be appreciated that the one or more method steps mentioned in this application does not exclude that there may be other method steps before or after the combined steps, or other method steps may be inserted between these explicitly mentioned steps, unless specified otherwise. It shall further be appreciated that combination connection relationship between one or more devices/apparatuses mentioned in the present application does not exclude that there may be other devices/apparatuses before or after the combined devices/apparatuses, or other devices/apparatuses may further be inserted between two of the devices/apparatuses mentioned, unless specified otherwise. Moreover, unless specified otherwise, a numeral of each method step is only a convenient tool for identifying each method step, rather than to limit a sequence of the method steps or to limit a scope of implementation of the present application. In a case where there is no substantive change to the technical content, a change or adjustment to a relative relationship shall be deemed to be within the scope of implementation of this application. Batteries in Examples 1-17 and Comparative Example 1 are prepared according to the following methods.

(1) Preparation of a Positive Electrode Plate

Mix positive active material $LiNi_{0.8}Co_{0.1}Mn_{0.1}O_2$, conductive agent conductive carbon, and binder polyvinylidene fluoride (PVDF) in a mass ratio of 96:2:2, and stir mixture thereof by a vacuum mixer until the mixture is even to obtain a lithium-ion battery positive slurry with a certain viscosity. Evenly coat the positive slurry on both surfaces of a positive electrode current collector aluminum foil, dry the slurry at 85° C., then cold press it, and then trim, cut, and slit it. After slitting, dry it for 4 hours under a vacuum condition and at a temperature of 85° C., and weld it with tabs to form a positive electrode plate of the lithium battery.

(2) Preparation of a Negative Electrode Plate

A preparation method of the negative electrode plate of Examples 1-17 is as follows: mix silicon monoxide and artificial graphite in a mass ratio of 3:7 to obtain a negative active material, then mix the negative active material, negative binder styrene butadiene rubber (SBR), and negative conductive agent conductive carbon black Super P with solvent N-methylpyrrolidone (NMP) at a mass ratio of 92:3:5 to form a negative slurry, then evenly coat the negative slurry by a coating weight of 130 mg/1540 mm² on two sides of a negative current collector copper foil, and then dry it in an oven at 85° C. to form an initial negative electrode plate.

A preparation method of the negative electrode plate of Comparative Example 1 is as follows: mix silicon monoxide and artificial graphite in a mass ratio of 3:7 to obtain a negative electrode material, then mix the negative active material, negative binder styrene butadiene rubber, and negative conductive agent conductive carbon black Super P with solvent N-methylpyrrolidone (NMP) at a mass ratio of 92:3:5 to form a negative slurry, then evenly coat the negative slurry by a coating weight of 130 mg/1540 mm² on two sides of a negative current collector copper foil, and then dry it in an oven at 85° C. to form an initial negative electrode plate.

(3) Preparation of a Separator

Select a polyethylene microporous film with a thickness of 16 um for a porous substrate separator material.

(4) Preparation of Electrolyte

Dissolve lithium hexafluorophosphate in a mixed solvent composed of ethylene carbonate, dimethyl carbonate and ethyl methyl carbonate, volume ratio of the three components being 1:2:1, to obtain a required electrolyte.

(5) Lithium Replenishing of the Negative Electrode Plate

Perform lithium replenishing on the negative electrode plate obtained according to the above methods in Examples 1-17 and Comparative Example 1 in a synchronous rolling and/or asynchronous rolling manner according to a lithium-replenishing parameter shown in Table 1. Select two rolls with different diameters or two different linear speeds to ensure that the two linear speeds are asymmetric. The two rolls may be defined as a fast roll and a slow roll. Roll a thick lithium stripe twice to obtain an ultra-thin lithium foil. A speed of the fast roll is: 5-100 m/min, a speed of the slow roll is 1-50 m/min, and a rolling force between the two rolls is 1-10 T. Adhere the ultra-thin lithium foil to a surface of the negative electrode plate to complete lithium replenishing of the negative electrode plate.

(6) Preparation of a Lithium-Ion Battery

Lay the positive electrode plate, the separator, and the negative electrode plate in order, so that the separator is located between the positive and negative electrode plates for isolation. Wind these layers to obtain a bare cell. Place the bare cell in a housing and dry the bare cell. After drying, inject electrolyte into the housing. Obtain the lithium-ion battery after a series of processes such as vacuum packaging, standing, forming, and shaping.

(7) Formation of the Cell

Charge the lithium-ion battery completed to a voltage of 4.2V with a current rate of 1 C. Discharge the lithium-ion battery to a voltage of 3.0V with the current rate of 1 C. For example, the battery capacity of the above cell is 70 Ah. Therefore, the current rate of 1 C means to charge and discharge the cell with a current of 72 Ah.

In the following, plate temperature, formation interface and cell cycle performance test methods are described.

(1) The plate temperature test method is as follows.

Use a 6-inch roll to wind 1000 m, insert a temperature sensing wire at 500 m to test temperature of the plate, and read data directly. A temperature test instrument is: thermometer SKF TKDT 10.

(2) The formation interface test method is as follows.

A cell formation method is as follows: charge the lithium-ion battery completed to a voltage of 4.2V with a current rate of 1 C, and discharge the lithium-ion battery to a voltage of 3.0V with the current rate of 1 C. For example, the battery capacity of the above cell is 70 Ah. Therefore, the current rate of 1 C means to charge and discharge the cell with a current of 72 Ah.

After formation, perform a first charge and discharge to the cell after liquid injection. A charge and discharge device for the lithium-ion battery is: Xinwei product-only tester for mobile power supply (6V4A). After the formation, remove the cell. A plate interface is the formation interface. If there is lithium foil remaining on the formation interface, the formation interface is determined as NG. If there is no lithium foil with metallic luster remaining, the interface is determined as OK.

(3) The cell cycle performance test method is as follows.

Herein, use the Xinwei product-only tester for mobile power supply (6V4A) to repeat charge and discharge until a capacity attenuation rate reaches 80%. A capacity of the above cell is 70 Ah. Repeat charge and discharge to the cell. When the cell capacity decays to 56 Ah, stop the test and record the number of repeated charges and discharges as cycle performance data of the cell.

TABLE 1

Plate lithium-replenishing parameters and text results of the cell provided in Examples 1-17 and Comparative Example 1

| Groups | A (μm) | B (μm) | A/(A + B) | θ (°) | L (μm) | L/A | C/M | TP | FI | C1 | C |
|---|---|---|---|---|---|---|---|---|---|---|---|
| Example 1 | 10 | 3000 | 3.3 × 10$^{-3}$ | 0 | 2 | 0.2 | 0.04 | 35 | NG | 5.2 | 750 |
| Example 2 | 50 | 1500 | 3.2 × 10$^{-2}$ | 0 | 10 | 0.2 | 0.04 | 38 | OK | 5 | 770 |
| Example 3 | 1000 | 500 | 0.667 | 0 | 200 | 0.2 | 0.04 | 45 | OK | 1 | 900 |
| Example 4 | 1500 | 100 | 0.938 | 0 | 300 | 0.2 | 0.04 | 57 | OK | 0.2 | 790 |
| Example 5 | 2000 | 50 | 0.976 | 0 | 400 | 0.2 | 0.04 | 60 | OK | 0.02 | 750 |
| Example 6 | 1000 | 500 | 0.667 | 30 | 200 | 0.2 | 0.04 | 50 | OK | 1.1 | 810 |
| Example 7 | 1000 | 500 | 0.667 | 45 | 200 | 0.2 | 0.04 | 52 | OK | 0.9 | 790 |
| Example 8 | 1000 | 500 | 0.667 | 60 | 200 | 0.2 | 0.04 | 58 | OK | 1 | 785 |
| Example 9 | 1000 | 500 | 0.667 | 75 | 200 | 0.2 | 0.04 | 60 | OK | 1.1 | 776 |
| Example 10 | 1000 | 500 | 0.667 | 80 | 200 | 0.2 | 0.04 | 64 | NG | 1.1 | 750 |
| Example 11 | 1000 | 500 | 0.667 | 0 | 50 | 0.05 | 0.04 | 42 | OK | 1 | 910 |
| Example 12 | 1000 | 500 | 0.667 | 0 | 500 | 0.5 | 0.04 | 53 | OK | 0.9 | 850 |
| Example 13 | 1000 | 500 | 0.667 | 0 | 800 | 0.8 | 0.04 | 60 | NG | 0.9 | 750 |
| Example 14 | 1000 | 500 | 0.667 | 0 | 200 | 0.2 | 3.3 × 10$^{-3}$ | 60 | OK | 0.03 | 850 |
| Example 15 | 1000 | 500 | 0.667 | 0 | 200 | 0.2 | 0.01 | 55 | OK | 0.5 | 870 |
| Example 16 | 1000 | 500 | 0.667 | 0 | 200 | 0.2 | 0.1 | 51 | OK | 2.5 | 800 |
| Example 17 | 1000 | 500 | 0.667 | 0 | 200 | 0.2 | 0.4 | 47 | NG | 5.1 | 750 |
| Example 1 | 5 | 6000 | 8*10$^{-4}$ | 0 | 1 | 0.2 | 0.04 | 30 | NG | 6 | 655 |
| Example 2 | 3500 | 20 | 0.997 | 0 | 700 | 0.2 | 0.04 | 75 | NG | 0.01 | 720 |
| Example 3 | / | / | / | / | / | / | 0 | 28 | OK | / | 600 |

Notes:
TP: Temperature of the plate (° C.);
FI: Formation interface (OK/NG);
C1: Thickness of the lithium-replenishing region after formation (μm);
C: Cycle performance (Cycle).

According to the experimental data in Table 1, it can be obtained from the Comparative Examples 1-2 and the Examples 1-5 that under the same conditions of stripe angle θ, the same L/A and the same C/M of the lithium-replenishing region, the width A of the lithium-replenishing region and the width B of the gap region cooperatively affect a final plate winding temperature. The width A of the lithium-replenishing region and the width B of the gap region shall satisfy condition of $3.3 \times 10^{-3} \leq A/(A+B) < 0.98$. If A/(A+B) is less than $3.3 \times 10^{-3}$ (Comparative Example 1), an interface formation result is not good and the cycle performance is poor. If A/(A+B) is greater than 0.98 (Comparative Example 2), a heat temperature of the plate is too high, which is likely to cause a safety accident. Therefore, by reasonably setting values of the width A of the lithium-replenishing region and the width B of the gap region, so that A/(A+B) satisfy condition of $3.3 \times 10-3 \leq A/(A+B) < 0.98$.

By enabling A/(A+B), a relationship between the width A of the lithium-replenishing region and the width B of the gap region, to satisfy a certain standard in Examples 3 and 6-10, while L/A thereof is the same and C/M thereof is the same, if the lithium-replenishing region angle θ is excessively large (Embodiment 10), temperature of the plate may be too high and interface formation may not be ideal.

According to Examples 3 and 11-13, the applicant finds that in a case that the relationship formula between the width A of the lithium-replenishing region and the width B of the gap region satisfies a certain standard, the lithium-replenishing region angle θ is the same and C/M thereof is the same, if L/A is excessively large (Example 13), an interface formation result and cycle performance may not be ideal.

According to Examples 3 and 14-17, in a case that the relationship formula between the width A of the lithium-replenishing region and the width B of the gap region satisfies a certain standard, the lithium-replenishing region angle θ is the same and L/A thereof is the same, if C/M is excessively small (Example 14), temperature of the plate increases; if C/M is excessively large (Example 17), a lithium layer is loose and so a lithium replenishing result thereof is not ideal, nor is the cycle performance.

It shall be noted that although the above embodiments are described in the present application, this does not mean to limit the scope of patent protection of this application. Therefore, based on the innovative ideas of this application, changes and modifications to the embodiments described herein, equivalent structures and equivalent process transformations made according to the description and drawings of the present application, direct and indirect applications of the above technical solutions in other related technical fields are all included in the scope of patent protection of this application.

What is claimed is:

1. A negative electrode plate, comprising:
   a negative electrode current collector;
   a negative electrode active material layer comprising a negative electrode active material and disposed on at least one surface of the negative electrode current collector; and
   a lithium-replenishing layer disposed on a surface of the negative electrode active material layer away from the negative current collector;
   wherein the lithium-replenishing layer comprises a lithium-replenishing region and a gap region, and the lithium-replenishing region and the gap region being interconnected in order,
   the lithium-replenishing region has a width A of 50 μm≤A≤2000 μm,
   the gap region has a width B of 50 μm≤B≤1500 μm,
   A, B are measurement values measured along an extension direction of connection between the lithium-replenishing region and the gap region,
   the lithium-replenishing region and the gap region further satisfy $3.0 \times 10^{-2} \leq A/(A+B) < 0.976$,
   a middle line of the lithium-replenishing region and a direction of a width of the negative electrode plate have an angle θ, and the angle θ satisfies condition of 0°≤θ≤75°, a ratio of a distance difference L of an edge of the lithium-replenishing region to the width A of the lithium-replenishing region satisfies condition of 0<L/A≤0.5, a ratio of a thickness of the lithium-replenishing region to a weight of the negative electrode active material satisfies condition of 0.02≤C/M≤0.18;

wherein C is the thickness of the lithium-replenishing region, and M is the weight of the negative electrode active material, and the C/M has a unit of 1540.25 μm/mg/mm².

2. The negative electrode plate according to claim 1, wherein the lithium-replenishing region and the gap region satisfy condition of 3.0×10⁻²≤A/(A+B)<0.938.

3. The negative electrode plate according to claim 1, wherein the lithium-replenishing region and the gap region satisfy condition of 0.667≤A/(A+B)≤0.976.

4. The negative electrode plate according to claim 1, wherein the width A is of 50 μm≤A≤1500 μm.

5. The negative electrode plate according to claim 1, wherein the width B is of 50 μm≤B≤500 μm.

6. The negative electrode plate according to claim 1, wherein 1000 μm≤A≤2000 μm, and 100 μm≤B≤500 μm.

7. The negative electrode plate according to claim 1, wherein 0°≤θ≤60°.

8. The negative electrode plate according to claim 7, wherein 0°≤θ≤45°.

9. The negative electrode plate according to claim 1, wherein a ratio of a distance difference L of an edge of the lithium-replenishing region to the width A of the lithium-replenishing region satisfies condition of 0<L/A≤0.2.

10. The negative electrode plate according to claim 9, wherein 0.05≤L/A≤0.20.

11. The negative electrode plate according to claim 1, wherein a ratio of a thickness of the lithium-replenishing region to a weight of the negative electrode active material satisfies condition of 0.02≤C/M≤0.18;

wherein C is the thickness of the lithium-replenishing region, and M is the weight of the negative electrode active material.

12. The negative electrode plate according to claim 11, wherein 0.06≤C/M≤0.13.

13. The negative electrode plate according to claim 1, wherein a component of the lithium-replenishing region is selected from one or more of elemental lithium, lithium oxide, lithium nitride, lithium fluoride, lithium hydroxide and lithium silicon alloy.

14. The negative electrode plate according to claim 1, wherein the negative electrode active material comprises one or more of a Si-based material, a Sn-based material, Si/C, Sn/C, Si halide, Sn halide, Si alloy and Sn alloy.

15. A lithium-ion battery, comprising a positive electrode, a negative electrode, an electrolyte and a separator, wherein the negative electrode comprises the negative electrode plate according to claim 1.

16. The lithium-ion battery according to claim 15, wherein the lithium-replenishing region has a thickness C1 of 0.05 μm≤C1≤10 μm after formation.

17. A battery module, comprising the lithium-ion battery according to claim 15.

18. A battery pack, comprising the battery module according to claim 17.

19. An apparatus, comprising the lithium-ion battery according to claim 15.

20. The apparatus according to claim 19, wherein the apparatus is selected from one or more of an electric vehicle, an electric ship, an electric tool, an electronic device and an energy storage system.

* * * * *